United States Patent [19]
Wilson

[11] Patent Number: 4,557,032
[45] Date of Patent: * Dec. 10, 1985

[54] METHOD OF MAKING A BELT TENSIONER

[75] Inventor: Leslie B. Wilson, Reeds Spring, Mo.

[73] Assignee: Dayco Corporation, Dayton, Ohio

[*] Notice: The portion of the term of this patent subsequent to Aug. 21, 2001 has been disclaimed.

[21] Appl. No.: 613,947

[22] Filed: May 25, 1984

Related U.S. Application Data

[62] Division of Ser. No. 296,693, Aug. 27, 1981, Pat. No. 4,466,803.

[51] Int. Cl.⁴ .............................................. B23P 11/00
[52] U.S. Cl. ................................ 29/434; 29/157.1 R; 267/162
[58] Field of Search ............. 29/157 R, 157.1 R, 434, 29/454; 188/285, 290, 302, 306; 267/162; 464/180; 474/103, 104, 109, 110, 111, 131, 132, 133, 134, 135, 136, 137, 138, 148

[56] References Cited

U.S. PATENT DOCUMENTS

| | | | |
|---|---|---|---|
| 2,729,112 | 1/1956 | Wendshuh et al. | 474/104 |
| 3,104,789 | 9/1963 | Fife | 474/104 X |
| 3,463,022 | 8/1969 | Miller | 474/110 |
| 3,901,563 | 8/1975 | Day | 474/110 X |
| 3,964,331 | 6/1976 | Oldfield | 474/110 |
| 4,283,181 | 8/1981 | Sproul | 474/110 |
| 4,283,182 | 8/1981 | Kraft | 474/110 |
| 4,354,595 | 10/1982 | Reynolds | 474/104 X |

FOREIGN PATENT DOCUMENTS 279415 3/1952 Switzerland ....................... 474/135

Primary Examiner—Howard N. Goldberg
Assistant Examiner—Ronald S. Wallace
Attorney, Agent, or Firm—Joseph V. Tassone

[57] ABSTRACT

A tensioner for a power transmission belt that is adapted to be operated in an endless path and a method of making the same are provided, the tensioner comprising a support unit for being fixed relative to the belt, a belt engaging unit carried by the support unit and being movable relative thereto, a mechanical spring unit operatively associated with the support unit and the belt engaging unit for urging the belt engaging unit relative to the support unit and against the belt with a force to tension the belt, and a fluid operated transmitting unit operatively associated with the spring unit and the belt engaging unit for translating motion therebetween whereby the spring unit is adapted to be disposed remote from the belt engaging unit.

13 Claims, 4 Drawing Figures ional patent application of
its copending parent patent application, Ser. No.
296,693, filed Aug. 27, 1981, now U.S. Pat. No.
4,466,803, issued Aug. 21, 1984.

BACKGROUND OF THE INVENTION

1. Field of the Invention

This invention relates to a tensioner for an endless power transmission belt or the like as well as to a method of making such a tensioner.

2. Prior Art Statement

It is known in the art to provide a tensioner for a power transmission belt that is adapted to be operated in an endless path, the tensioner comprising a support means for being fixed relative to the belt, a belt engaging means carried by the support means and being movable relative thereto, and mechanical spring means operatively associated with the support means and the belt engaging means for urging the belt engaging means relative to the support means and against the belt with a force to tension the belt.

Examples of tensioners of the above mentioned type are provided in the following five U.S. Patents:
(1) U.S. Pat. No. 3,413,866—Ford
(2) U.S. Pat. No. 4,108,013—Sragal
(3) U.S. Pat. No. 4,145,934—Sragal
(4) U.S. Pat. No. 4,151,756—Binder et al
(5) U.S. Pat. No. 4,249,425—Watson It appears from item (1) above that a tension spring urges an idler pulley in tensioning engagement against a belt.

It appears from item (2) above that a compression spring urges an idler pulley in tensioning engagement against a belt.

It appears from item (3) above that a leaf spring urges an idler pulley in tensioning engagement against a belt.

It appears from item (4) above that a plurality of bi-metal dish-shaped springs disposed in various stacked relations thereof urge an idler pulley in tensioning engagement against a belt.

It appears from item (5) above that pneumatic means is adapted to threadedly adjust an idler pulley rod of a belt tensioner wherein a pair of dish-shaped springs urge the idler pulley in tensioning engagement against a belt.

It is also known in the art to provide a piston and cylinder arrangement for hydraulically urging an idler pulley in tensioning engagement against a belt.

For example, see the following two U.S. Patents:
(6) U.S. Pat. No. 3,142,193—Polko
(7) U.S. Pat. No. 4,276,038—Kraft It is also known to provide a belt tensioner where friction surface dampening means of the solid type are utilized to tend to dampen vibrations and the like that are imposed on the belt tensioner.

SUMMARY OF THE INVENTION

It is one feature of this invention to provide an improved tensioner for a power transmission belt or the like.

In particular, it was found according to the teachings of this invention that because of the present fuel shortage situation, transportation vehicles and their engines are becoming smaller so that packaging of the components that make up the engine is becoming increasingly difficult whereby it is desirable that the belt tensioners for the power transmission belts of such engines occupy less space within the drive belt systems than present belt tensioners.

Accordingly, it was found according to the teachings of this invention that it is possible to dispose the mechanical spring means of the belt tensioner remote from the belt engaging means to reduce the size of the belt tensioner in the region of the drive belt system, this feature being accomplished by utilizing a fluid operated transmitting means in a unique manner.

For example, one embodiment of this invention provides a tensioner for a power transmission belt that is adapted to be operated in an endless path, the tensioner comprising a support means for being fixed relative to the belt, a belt engaging means carried by the support means and being movable relative thereto, mechanical spring means operatively associated with the support means and the belt engaging means for urging the belt engaging means relative to the support means and against the belt with a force to tension the belt, and a fluid operated transmitting means operatively associated with the spring means and the belt engaging means for translating motion therebetween whereby the spring means is adapted to be disposed remote from the belt engaging means. The fluid operated means for translating motion comprises a first piston and cylinder means operatively associated with the spring means, a second piston and cylinder means operatively associated with the belt engaging means and conduit means fluidly interconnecting the first and second piston and cylinder means together. The first piston and cylinder means comprises a cylinder member and a piston member disposed in the cylinder member, one of the members being adapted to be movable relative to the other of the members whereby the other of the members comprises part of the support means. The spring means engages and acts between the support means and the one of the members. The second piston and cylinder means comprises a cylinder member and a piston member disposed in said cylinder member, one of the members of the second piston and cylinder means being interconnected to the belt engaging means and being adapted to be movable relative to the other of the members thereof whereby the other of the members thereof comprises part of the support means.

Accordingly, it is an object of this invention to provide an improved tensioner for a power transmission belt or the like, the tensioner of this invention having one or more of the novel features of this invention as set forth above or hereinafter shown or described.

Another object of this invention is to provide an improved method of making a tensioner for a power transmission belt or the like, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

DESCRIPTION OF THE PREFERRED EMBODIMENT

Figure 1:
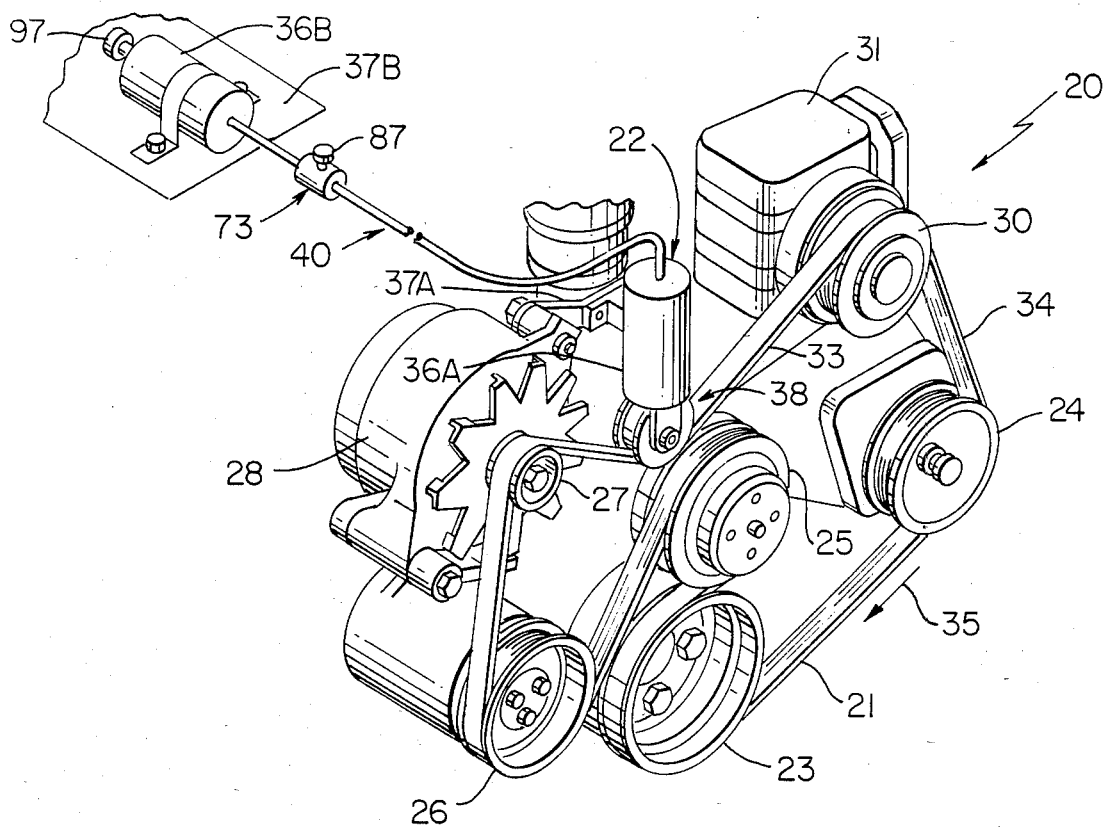
FIG. 1 is a fragmentary isometric view looking toward the front end of an automobile engine which utilizes one embodiment of the belt tensioner of this invention.

While the various features of this invention are hereinafter illustrated and described as providing a belt tensioner for a particular power transmission belt of a particular motor vehicle engine, it is to be understood that the various features of this invention can be utilized singly or in any combination thereof to provide a belt tensioner for other arrangements as desired.

Therefore, this invention is not to be limited to only the embodiment illustrated in the drawings, because the drawings are merely utilized to illustrate one of the wide varieties of uses of this invention.

Figure 2:
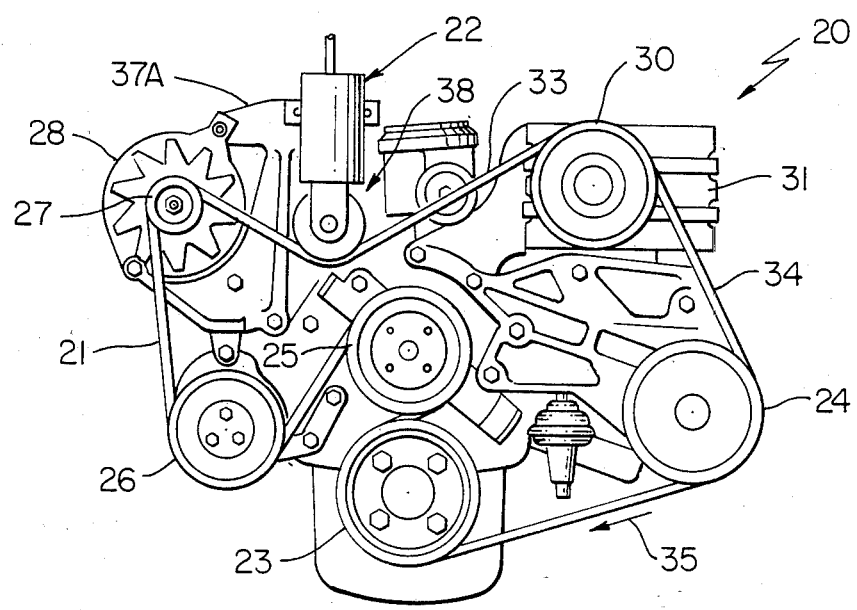
FIG. 2 is a view looking perpendicularly toward the front end of the automobile engine of FIG. 1.

Referring now to FIGS. 1 and 2, an automobile engine is generally indicated by the reference numeral 20 and utilizes an endless power transmission belt 21 for driving a plurality of driven accessories as hereinafter set forth, the improved belt tensioner of this invention being generally indicated by the reference numeral 22 and being utilized to provide a tensioning force on the belt 21 in a manner hereinafter set forth.

The endless power transmission belt 21 may be of any suitable type known in the art and is preferably made primarily of a polymeric material because the unique features of the tensioner 22 of this invention readily permits the tensioner 21 to tension a belt having a polyester load-carrying cord in and efficient manner as hereinafter described.

The belt 21 is driven by a driving sheave 23 which is operatively interconnected to the crankshaft of the engine 20 in a manner well known in the art. The driving sheave 23 drives the belt 21 in an endless path and thereby drives a sheave 24 of a power steering device used in an automobile (not shown) utilizing the engine 20, a sheave 25 of an engine water pump, a sheave 26 of an air pump of a type used in an antipollution system for the engine 20, a sheave 27 of an engine electrical alternator 28, and a sheave 30 of a compressor 31 of an air conditioning system for the automobile utilizing the engine 20.

All of the driven accessories, through their sheaves 24, 25, 26, 27 and 30, impose a load on the belt 21. However, only the detailed description of the load being imposed by the compressor 31 and its sheave 30 on the belt 21 will be hereinafter described inasmuch as such load is generally of a comparatively high magnitude.

In particular, the compressor 31, upon being driven, creates a slack side 33 and a tight side 34 in the belt 21 upon turning on of the air conditioner system in the automobile, the slack side 33 and tight side 34 being produced since the belt is rotating clockwise as indicated by the arrow 35 in FIGS. 1 and 2.

The belt tight side 34 (and hence, slack side 33) varies in tightness, i.e., magnitude of tightness, in a cyclic manner and as a function of the inherent cyclic change in the loads imposed by the air compressor 31. This cyclic change and load varies between greater extremes in applications where the compressor 31 is of a piston type. The cyclic load imposed by the compressor 31 has a tendency to cause the slack side 33 of the belt 21 to vibrate or oscillate.

In addition to such vibrations and oscillations of the belt 21, it is known that normal belt wear and heat variations in the engine compartment for the engine 20 produces variations in the length of the belt 21 that require compensation for the same.

Thus, it is known that it is difficult to maintain such a belt 21 under tension with a force required to insure non-slipping engagement and driving of the driven sheaves whereby numerous belt tensioners have been proposed and used heretofore in an effort to provide the required tension.

It is believed that the improved belt tensioner 22 of this invention functions in a manner to provide a proper tensioning force on the belt 21 to overcome the aforementioned problems, namely, provides the required tension in the overall belt 21 as well as prevents any tendency of the belt to oscillate in an undesirable manner as a result of the cyclic load change imposed by the compressor 31.

In addition, it is believed that the improved belt tensioner 22 of this invention, while providing the above functions, is relatively small and compact because the same has a part thereof disposed remote from the belt 21 so that the remaining part of the belt tensioner 22 of this invention that is disposed adjacent the belt 21 does not take up a large amount of space as is required for prior known belt tensioners whereby the improved belt tensioner 22 of this invention will now be described.

Figures 3, 4:
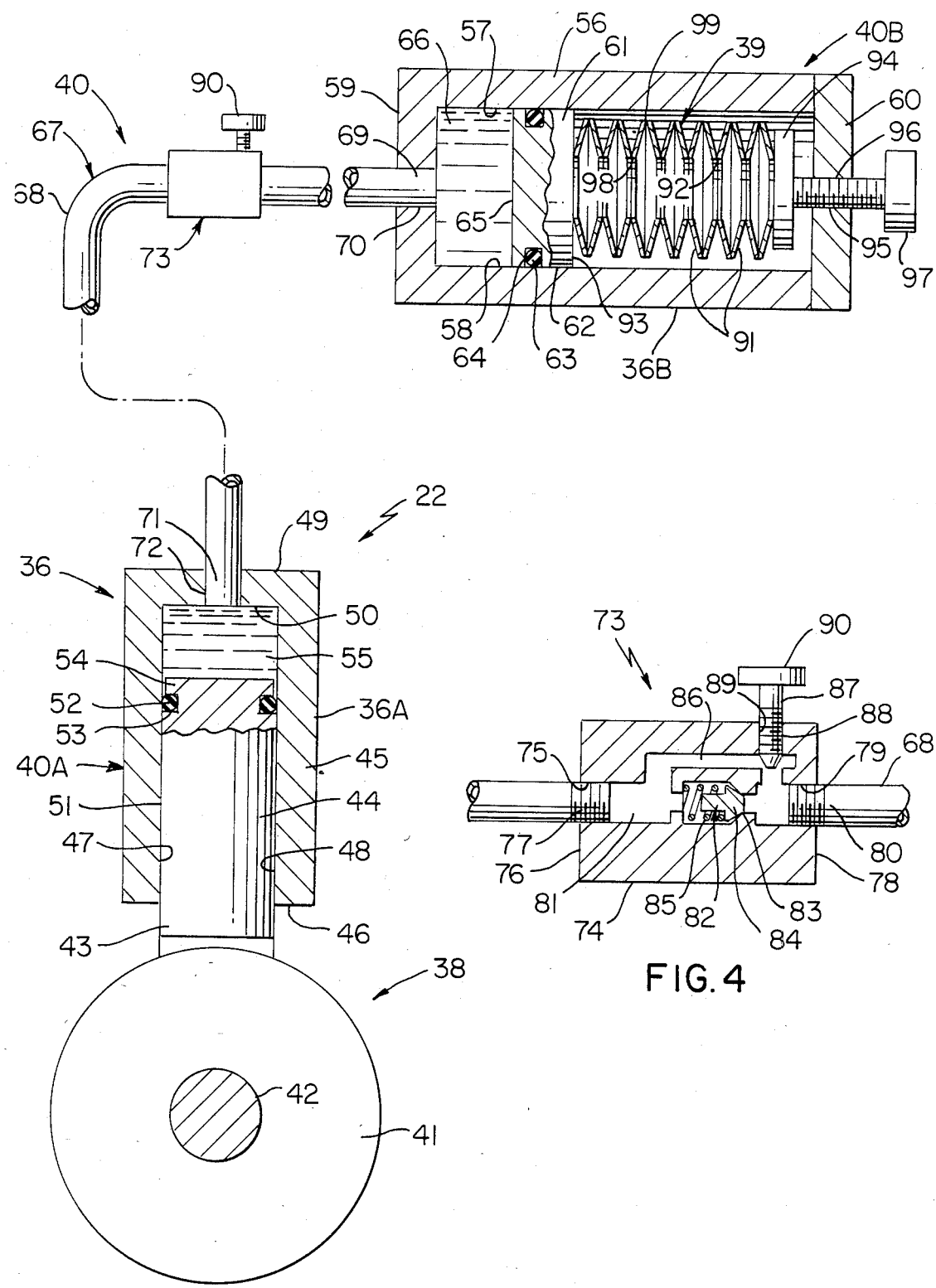
FIG. 3 is an enlarged schematic view, partially in cross-section, illustrating the improved belt tensioner of this invention that is being utilized for tensioning the power transmission belt of FIGS. 1 and 2.
FIG. 4 is a fragmentary, cross-sectional view illustrating a typical flow control valve that can be utilized with the belt tensioner of this invention that is illustrated in FIG. 3.

As best illustrated in FIG. 3, the improved belt tensioner 22 of this invention comprises a support means that is generally indicated by the reference numeral 36 and comprises two parts 36A and 36B, the support means 36A being adapted to be fixed in any suitable manner to a mounting bracket 37A of the engine 20 as illustrated in FIGS. 1 and 2, while the support means 36B is adapted to be mounted to a bracket 37B located anywhere that is desired and remote from the bracket 37A as schematically illustrated in FIG. 1 so that the support means 36B does not take up any room adjacent the belt 21 for the reasons previously set forth.

A belt engaging means that is generally indicated by the reference numeral 38 is movably carried by the support means 36A in a manner hereinafter set forth and thereby forms part of the tensioner 22 of this invention.

The tensioner 22 has mechanical spring means that is generally indicated by the reference numeral 39 operatively associated with the support means 36B and the belt engaging means 38 in a manner hereinafter set forth to tend to urge the belt engaging means 38 against the slack side 33 of the belt 21 in substantially a true vertically downwardly direction in a manner to substantially bisect the angle made by the belt 21 between the sheaves 27 and 30 as illustrated in FIG. 2, the spring means 39 being carried by the support means 36B in a manner hereinafter set forth so as to also be disposed remote from the belt 21.

The belt tensioner 22 also includes a fluid operated transmitting means that is generally indicated by the reference numeral 40 is operatively associated with the spring means 39 and the belt engaging means 38 to translate motion therebetween in a manner hereinafter set forth whereby the spring means 39 is adapted to be disposed remote from the belt engaging means 38.

The belt engaging means 38 includes an idler pulley 41 rotatably mounted on an axle 42 carried in any suitable manner by an end 43 of a piston member 44 that is adapted to reciprocate in a cylinder member 45, the cylinder member 45 comprising support means 36A that is secured to the bracket 37A of the engine 20 whereby the cylinder member 45 is adapted to be stationary while the piston member 44 is movable relative thereto.

In particular, the cylinder member 45 has an end 46 thereof interrupted by a cylindrical bore 47 that defines an internal cylindrical peripheral surface 48 thereof that terminates short of the other end 49 thereof to define an end wall 50. The piston member 44 has an external cylindrical peripheral surface 51 adapted to be sealingly disposed in axial sliding engagement with the internal peripheral surface 48 of the cylinder member 45 by carrying a suitable resilient O-ring sealing means 52 in an annular groove 53 formed in an upper end 54 thereof as schematically illustrated in FIG. 3 whereby the upper end 54 of the cylinder member 44 cooperates with the cylinder member 45 to define a chamber 55 therein that is defined between the upper end 54 of the piston member 44 and the end wall 50 of the cylinder member 45.

The cylinder member 45 and piston member 44 define part of the fluid operated transmitting means 40 as will be apparent hereinafter and thereby comprise a piston and cylinder means that is generally indicated by the reference numeral 40A.

The support means 36B also comprises a cylinder member 56 having a cylindrical bore 57 therein defining an internal cylindrical peripheral surface 58 thereof between opposed end walls 59 and 60 thereof. A cylindrical piston member 61 is disposed in the cylindrical bore 57 of the cylinder member 56 and has an external cylindrical peripheral surface 62 disposed in axial sliding relation with the internal peripheral surface 58 of the cylinder member 56 and is sealed thereto by a suitable annular resilient O-ring sealing means 63 disposed in annular groove 64 of the piston member 61. In this manner, the side 65 of the piston member 61 cooperates with the end wall 58 to define a fluid chamber 66 therebetween.

The cylinder member 56 and piston member 61, in a manner similar to the cylinder member 45 and piston member 44, define part of the fluid operated transmitting means 40 of this invention as will be apparent hereinafter and thereby comprise a piston and cylinder means that is generally indicated by the reference numeral 40B.

The fluid operated transmitting means 40 of this invention includes a passage defining means that is generally indicated by the reference numeral 67 and comprises a conduit means 68 having one end 69 secured in an opening 70 formed in the end wall 59 of the cylinder member 56 so as to be in fluid communication with the chamber 66 while the other end 71 thereof is secured in an opening 72 formed in the end wall 50 of the cylinder member 45 so as to be in fluid communication with the chamber 55 thereof.

In this manner, by filling the chambers 55 and 66 of the cylinder members 45 and 56 as well as the conduit means 68 with any suitable hydraulic fluid, such as a hydraulic oil, movement of the piston member 61 in the cylinder member 56 to decrease the volume of the chamber 66 thereof will be translated to the cylinder member 45 to increase the volume of the chamber 55 thereof a like amount and, thus, extend the piston 44 downwardly in FIG. 3 in a belt tensioning direction. Conversely, any movement of the piston member 44 upwardly in FIG. 3 relative to the cylinder member 45 to decrease the volume of the chamber 55 is translated by the fluid to the chamber 66 in a manner to tend to increase the volume of the chamber 66 a like amount and, thus, move the piston member 61 to the right in FIG. 3 relative to the cylinder member 56 for a purpose hereinafter described.

Thus, it can be seen that the fluid operated transmitting means 40 translates movement between the piston members 61 and 44 for a purpose hereinafter described.

The conduit means 68 of the fluid operated transmitting means 40 of this invention has a flow control valve means disposed therein that is generally indicated by the reference numeral 73 and can be of any conventional form well known in the art. One typical flow control valve means 73 that can be utilized is illustrated in FIG. 4 and will be hereinafter described.

However, it is to be understood that the flow control valve means 73 can be a fixed flow control means, an adjustable flow control means and even be adapted to close the passage defining means 67 to substantially lock the idler pulley 41 in a set position relative to the support means 36A as will be apparent hereinafter.

As illustrated in FIG. 4, the flow control valve means 73 comprises a housing means 74 having an opening 75 at one end 76 thereof and receiving an end 77 of the conduit means 68 that leads from the cylinder member 45, the conduit end 77 being secured in the opening 75 in any suitable manner. Similarly, the other end 78 of the housing member 74 has an opening 79 receiving an end 80 of the conduit means 68 that leads from the cylinder member 56, the end 80 of the conduit means 68 being secured in the opening 79 in any suitable manner.

The housing member 74 of the flow control valve means 73 has a first passage 81 extending between the openings 75 and 79 thereof and contains a one-way check valve means 82 therein in a manner to prevent fluid flow through the passage 81 from the opening 75 to the opening 79 while permitting full and unrestricted fluid flow from the opening 79 to the opening 75 through the passage 81.

In particular, the one-way valve means 82 includes a valve seat 83 in the passage 81 adapted to be opened and closed by a valve member 84 urged toward its closed position by a compression spring 85 in a manner well known in the art. Thus, when fluid tends to flow from the opening 75 to the opening 79 through the passage 81, the check valve 84 closes against the valve seat 83 to prevent such fluid flow. However, when there is a fluid flow from the opening 79 to the opening 75 through the passage 81, the fluid acts against the valve member 84 and moves the same to the left in FIG. 4 in opposition to the force of the spring 85 to open the valve seat 83 and thereby flow through the opening 75 in an unrestricted manner.

The housing member 74 of the flow control valve means 73 has a second passage 86 therein extending between the openings 75 and 79 thereof in a parallel relation to the first passage 81, the passage 86 having the amount of fluid flow therethrough controlled by an adjustable valve member 87 in a manner well known in the art. The adjustable valve member 87 has an externally threaded portion 88 threadedly disposed in a threaded opening 89 in the housing means 74 so that the flow restricting valve member 87 can be threadedly adjusted by an operator turning a knob-like end 90 of the adjusting member 87 in a manner well known in the art.

Thus, it can be seen that when the fluid flows through the passage defining means 68 from the cylinder member 45 to the cylinder member 56, and thus, from the opening 75 to the opening 79 of the valve housing 74, the check valve means 82 closes the passage 81 so that the entire fluid flow is through the passage 86 in a restricted manner as determined by the position of the valve member 87. Conversely, when the fluid flow through the passage defining means 68 is from the cylinder member 56 to the cylinder member 45 and, thus, from the opening 79 to the opening 75 of the valve housing 74, the one-way check valve means 82 is opened so that full and unrestricted fluid flow is created between the cylinder members 56 and 45 for a purpose hereinafter described.

However, it is to be understood that the fluid flow from the cylinder member 56 to the cylinder member 45 could also be controlled by a flow control valve means, if desired, for a purpose hereinafter described.

The spring means 39 comprises a plurality of spring discs or washers 91 that have central openings 92 passing therethrough and being disposed in any desired stacked relation within the cylinder member 56 between the side 93 of the piston member 61 and an axially adjustable disc 94 also disposed in the cylinder member 56 adjacent the wall 60 thereof, the disc member 94 being carried on an externally threaded shaft 95 threadedly disposed in an internally threaded opening 96 formed through the end wall 60 and being threadedly adjustable therein by an operator grasping and turning a control knob end 97 of the threaded shaft 95. In this manner, the amount of deflection of the spring washers 91 between their inner peripheries 98 and their outer peripheries 99 can be selected for a purpose hereinafter described.

The spring washers 91 are of a type commonly sold and known as "belleville spring washers" and can be so selected and arranged so that the same will provide a substantially constant urging force or even an increasing urging force as the idler pulley 41 is being moved toward the belt 21 to take up further slack therein under the spring force of the spring washers 91 in a manner fully set forth and claimed in applicant's patent application, Ser. No. 296,694 filed Aug. 27, 1981, whereby such copending patent application is being incorporated into this disclosure by this reference thereto not only for a further description of the structure and operation of the spring washers 91, but also for a description of the reasons for and the operation of the fluid transmitting means 40 functioning in a manner to dampen vibrations of the belt 21 whereby a further discussion of the spring means 39 in this application is deemed unnecessary except to state that the spring washers 91 when compressed between their inner peripheries 98 and outer peripheries 99 deflect in such a manner that the same store spring energy to tend to expand the same and thereby urge the piston member 61 to the left in FIG. 3 and thereby urge the idler pulley 41 away from the support means 36A toward the belt 21 as will be apparent hereinafter.

Of course, it is to be understood that other types of mechanical spring means can be utilized in the tensioner 22 of this invention, if desired, whereby this invention is not to be limited to the particular spring washers 91 illustrated and described.

Therefore, it can be seen that it is a relatively simple method of this invention to form the belt tensioner 22 of this invention to operate in a manner now to be described.

The tensioner 22 of this invention is initially mounted to the engine 20 by securing the support means 36B in a remote manner to the bracket means 37B and by securing the support means 36A to the bracket 37A so that the idler pulley 41 is in engagement against the stationary belt 21 with the piston member 44 having its end 54 disposed at its closest position to the end wall 40 of the cylinder member 45 in order to allow full movement of the piston member 44 downwardly relative to the cylinder member 45 a distance that is required for normal take up movement of the idler pulley 41 on the belt 21 in a tensioning direction of the tensioner 22.

Thereafter, the amount of initial deflection of the spring washers 91 between their inner peripheries 98 and outer peripheries 99 is adjusted by the adjusting member 94 so that the spring washers 91 are compressed and store energy in a manner to tend to move the piston member 61 toward the end wall 59 and, thus, the idler pulley 41 towards the belt 21 whereby the initial tensioning force of the idler pulley 41 on the belt 21 is provided by the spring washers 91 in their initial deflected condition, the fluid operated transmitting means 40 translating the spring force to the idler pulley 41 by the force of the piston member 61 tending to force the liquid in the chamber 56 thereof to the chamber 55 of the cylinder member 45.

Thus, it can be seen that once the initial position of the tensioner 22 has been established so that the spring means 39 is under the desired amount of compression, the force of the spring means 39 tends to urge the belt engaging means 38 in its tensioning direction against the belt 21 with a force determined by the initial deflection of the spring washers 91 in the at rest position of the engine 20.

Thereafter, each time the engine 20 is initially started so as to cause slack in the slack side 33 of the belt 21 and a tightening in the tight side 34 thereof, the force of the spring means 39 causes the idler pulley 41 to move inwardly to take up the slack of the belt 21 on the slack side 33 thereof and provide a tensioning force thereof as determined by the force of the spring washers 91, such inward movement of the pulley 41 being caused by the piston member 61 of the cylinder member 56 moving to the left in FIG. 3 under the force of the spring washers 91 to displace a certain amount of liquid in the chamber 66 thereof through the passage defining means 67 to the chamber 55 of the cylinder member 45 to thereby act on the end 54 of the piston member 44 to drive the same downwardly. Such flow of liquid through the passage defining means 67 is unrestricted in the manner previously set forth so that such inward movement of the idler pulley 41 in a tensioning direction is unrestricted. However, it is to be understood that the movement of the idler pulley 41 in a tensioning direction could be dampened by restricting the flow through the passage defining means 68 in its tensioning direction if desired for the reasons fully set forth in the aforementioned copending patent application.

Thus, it can be seen that as the belt 21 is traveling in the direction of the arrow 35 in FIGS. 1 and 2 by the running engine 20, any vibrations and oscillations of the belt 21, such as caused by the turning on and off of the air conditioning compressor 31 as previously set forth, will cause an up and down oscillation of the portion 33 of the belt 21 which movement is imposed on the idler pulley 41 of the tensioner 22.

In those instances where the deflection of the portion 33 of the belt 21 is upwardly in FIGS. 1 and 2 to tend to cause the pulley 41 to move upwardly relative to the support means 36A, such movement causes the piston 44 to tend to move upwardly in the cylinder member 45 and force a certain amount of liquid in the chamber 55 through the passage defining means 68 to the chamber 66 and move the piston 61 to the right in FIG. 3 to further compress the spring washers 91. However, such flow of fluid from the chamber 55 of the cylinder member 45 to the chamber 66 of the cylinder member 56 is restricted by the flow control valve means 73 as such flow of fluid must pass through the restricted passage 86 of the flow control valve means 73 as previously set forth whereby the upward movement of the idler pulley 41 relative to the belt 21 is dampened with a greater restricting force than the dampening effect produced by the flow control valve means 73 in the movement of the idler pulley 41 in a tensioning direction.

In this manner, it is believed that the fluid operated transmitting means 40 of this invention will produce a dampening effect on the movement of the idler pulley 41 which will prolong the life of the tensioner 22 so that rapid oscillations of the spring means 39 cannot take place and the spring means 39 will perform its tensioning function in a relatively smooth manner while being disposed remote from the idler pulley 41 to save space in the region of the belt 21 of the engine 20.

In particular, since the restrictive passage means 86 of the flow control means 73 in combination with the nonrestrictive passage means 81 provides a preferential flow ratio that can be controlled or can be built into the tensioner 22, the tensioner 22 will deliver increased tension on the belt 21 when the belt 21 is subjected to acceleration and/or heavy cyclic loads commonly encountered in belt drive systems. Accordingly, if the fluid flow from the chamber 55 to the chamber 66 is more restrictive than reverse flow, load fluctuations in the belt system will result in the idler pulley 41 being moved down into the belt 21 more rapidly than movement of the idler pulley 41 upwardly relative to the belt 21. In this manner, the tensioner 22 will deliver greater tension when the system demands and less tension when less tension is required. This can result in increased bearing life in belt driven accessories, reduced belt slippage under heavy loading conditions and an increased effective life of the tensioner 22 itself.

It is to be understood that while the tensioner 22 of this invention has been described as operating with a liquid disposed in the fluid operated transmitting means 40 thereof, the fluid operated transmitting means 40 could utilize air or other suitable gases as desired because the tensioner 22 would operate in a similar manner whereby the transmitting means is described and claimed as a fluid operated transmitting means. Also, while the piston and cylinder means 40A and 40B respectively have been illustrated and described as having the cylinder member 45 and 56 held stationary, it is to be understood that the piston member 44 of the means 40A could be stationary while the cylinder member 45 is made movable relative thereto and has the idler pulley 41 carried thereby and/or the piston member 61 of the means 40B could be stationary while the cylinder member is made movable relative thereto.

Therefore, it can be seen that this invention not only provides an improved belt tensioner, but also this invention provides an improved method of making such a belt tensioner.

While the form and method of this invention now preferred have been illustrated and described as required by the Patent Statute, it is to be understood that other forms and method steps can be utilized and still fall within the scope of the appended claims.

What is claimed is:

1. In a method of making a tensioner for a power transmission belt that is adapted to be operated in an endless path, said method comprising the steps of providing a support means for being fixed relative to said belt, providing a belt engaging means to be carried by said support means and being movable relative thereto, and operatively associating mechanical spring means with said support means and said belt engaging means for urging said belt engaging means relative to said support means and against said belt with a force to tension said belt, the improvement comprising the steps of operatively associating a fluid operated transmitting means with said spring means and said belt engaging means for translating motion therebetween whereby said spring means is adapted to be disposed remote from said belt engaging means, forming said fluid operated transmitting means to comprise a first piston and cylinder means operatively associated with said spring means and a second piston and cylinder means operatively associated with said belt engaging means, interconnecting said first and second piston and cylinder means together with a conduit means, forming said first piston and cylinder means to comprise a cylinder member and a piston member disposed in said cylinder member, forming one of said members to be adapted to be movable relative to the other of said members whereby said other of said members comprises part of said support means, disposing said spring means to engage and act between said support means and said one of said members, forming said second piston and cylinder means to comprise a cylinder member and a piston member disposed in said cylinder member, and forming one of said members of said second piston and cylinder means to be interconnected to said belt engaging means and be adapted to be movable relative to the other of said members thereof whereby said other of said members thereof comprises part of said support means.

2. A method of making a tensioner as set forth in claim 1 and including the step of forming said fluid operated transmitting means to have means for controlling the movement of said belt engaging means by imposing a greater restricting force on said belt engaging means when said belt engaging means is being moved in one direction relative to said support means than the restricting force imposed on said belt engaging means by said fluid operated transmitting means when said belt engaging means is being moved in the opposite direction relative to said support means.

3. A method of making a tensioner as set forth in claim 2 and including the step of causing said one direction of movement of said belt engaging means relative to said support means that has said greater restricting force imposed thereon by said fluid operated transmitting means to be a direction that is opposed to said urging force of said spring means and, thus, to be a direction away from said belt.

4. A method of making a tensioner as set forth in claim 2 and including the step of forming said means for controlling said movement of said belt engaging means with means for adjusting the restricting force thereof in at least one direction of movement of said belt engaging means relative to said support means.

5. A method of making a tensioner as set forth in claim 1 and including the step of forming said conduit means to be a flexible tube so that said second piston and cylinder means can be disposed adjacent said belt and said first piston and cylinder means can be disposed remote from said belt with said conduit means being bent therebetween.

6. A method of making a tensioner as set forth in claim 5 and including the step of forming said fluid operated transmitting means to have a flow control device for controlling the flow rate of fluid through said conduit means in at least one direction of flow therethrough.

7. A method of making a tensioner as set forth in claim 6 and including the step of causing said one direction of flow of fluid through said conduit means to be from said second piston and cylinder means to said first piston and cylinder means.

8. In a method of making a tensioner for an endless power transmission belt, said method comprising the steps of providing means for fixing said tensioner relative to said belt, providing movable belt engaging means associated with said tensioner for engaging said belt, operatively associating mechanical spring means with said tensioner for urging said belt engaging means against said belt with a force to tension said belt, the improvement comprising the steps of; operatively associating a first piston and cylinder means with said spring means remote from said belt engaging means, operatively associating a second piston and cylinder means with said belt engaging means; interconnecting said first and second piston and cylinder means by a conduit whereby said spring means provides a constant force against said first piston which tends to push fluid means from said first cylinder into said conduit and into said second cylinder, said fluid means in said second cylinder forcing said second piston to urge said belt engaging means against said belt; said first and second piston and cylinder and said conduit comprising a fluid operated transmitting means which transfers the forces of said spring to said belt engaging means from a position remote from said tensioner.

9. A method of making a tensioner as set forth in claim 8 and including the step of forming said fluid operated transmitting means to have means for controlling the movement of said belt engaging means by imposing a greater restricting force on said belt engaging means when said belt engaging means is being moved in a direction away from said belt.

10. A method of making a tensioner as set forth in claim 9 and including the step of controlling said movement of said belt engaging means by restricting the flow of fluid in said fluid operated transmitting means.

11. A method of making a tensioner as set forth in claim 8 and including the step of forming said fluid operated transmitting means to have a flow control device for controlling the flow rate of fluid through said conduit means in at least one direction.

12. A method of making a tensioner as set forth in claim 11 in which said control device comprises a flow control valve which is adapted to lock said belt engaging means in a stationary position by completely cutting off the flow of said fluid.

13. A method of making a tensioner as set forth in claim 8 in which said spring means comprises a plurality of spring discs which are disposed in said first cylinder against said piston on the side of said piston opposite said fluid means.

* * * * *